United States Patent [19]

Takemasa

[11] Patent Number: 4,499,783
[45] Date of Patent: Feb. 19, 1985

[54] TAPE RECORDING MACHINE
[75] Inventor: Kaoru Takemasa, Saitama, Japan
[73] Assignee: Pioneer Electronic Corporation, Tokyo, Japan
[21] Appl. No.: 336,994
[22] Filed: Jan. 4, 1982
[30] Foreign Application Priority Data Jan. 7, 1981 [JP] Japan ................................. 56-716[U]
Jan. 7, 1981 [JP] Japan ..................................... 56-891

[51] Int. Cl.³ ...................... H04N 9/16; F16H 57/00; F16H 37/06
[52] U.S. Cl. .................................. 74/411; 74/665 A; 360/74.1; 360/74.2; 360/74.3
[58] Field of Search .................... 360/74.1, 74.2, 74.3, 360/91, 92, 93; 242/55.19, 197, 198, 199, 200; 74/206, 411, 665 A

[56] References Cited
U.S. PATENT DOCUMENTS

| 4,196,874 | 4/1980 | Ohara | 360/74.1 |
|---|---|---|---|
| 4,214,283 | 7/1980 | Fushimi et al. | 360/74.2 |
| 4,238,808 | 12/1980 | Tomita | 360/74.2 |
| 4,279,006 | 7/1981 | Sasaki | 360/74.1 |
| 4,305,103 | 12/1981 | Osanai | 360/93 |
| 4,318,138 | 3/1982 | Osanai | 360/74.1 |
| 4,326,225 | 4/1982 | Osanai | 360/74.1 |
| 4,329,720 | 5/1982 | Kodama | 360/74.3 |
| 4,342,055 | 7/1982 | Osanai | 360/74.2 |
| 4,346,414 | 8/1982 | Osanai | 360/74.2 |
| 4,383,282 | 5/1983 | Osanai | 360/74.1 |
| 4,386,381 | 5/1983 | Itai | 360/74.2 |

Primary Examiner—Lawrence J. Staab
Assistant Examiner—Michael David Bednarek
Attorney, Agent, or Firm—Sughrue, Mion, Zinn, Macpeak and Seas

[57] ABSTRACT

A pair of rotational transmission gears frictionally engage a shaft unit under a frictional force from a common spring, and a pivoting member carrying drive pinion gears pivots one pinion gear into engagement with a transmission gear for slow speed mode and second and third pinion gears into engagement with both of said transmission gears for high speed rotation.

13 Claims, 4 Drawing Figures

TAPE RECORDING MACHINE

BACKGROUND OF THE INVENTION

The present invention relates to a reel plate assembly for use in a tape deck drive mechanism.

In a typical tape deck, there is a significant concern that an excessive tension may be applied to a recording tape to be wound on a take-up reel during tape-travelling, starting or stopping. Therefore, a torque friction mechanism is usually provided in the reel assembly of a tape reel drive device, and rotational torque is imparted through the torque friction mechanism from a drive source.

On the other hand, there has recently been a great demand for a miniaturized cassette deck, particularly one with a low height. It is therefore highly desirable that the construction of the torque friction mechanism be simplified, while at the same time permitting easy selection of a desired torque transmission coefficient.

SUMMARY OF THE INVENTION

In view of the above, it is an object of the present invention to provide a miniaturized tape reel plate assembly in which the construction is simplified while at the same time permitting easy selection of a torque transmission coefficient.

According to the present invention, there is provided a novel reel assembly wherein a pair of flange portions confronting each other are formed on a reel shaft which is engageable with a tape reel, frictional members are mounted on confronting surfaces of the flange portions, a pair of rotational torque transmission gears which are rotatable with respect to each other are provided between the flange portions, and a spring member is adapted to press the rotational torque transmission gears to the flange portions. Further, a pivotable member carries pinion gears which can be pivotted into engagement with the frictional members for high speed rotation and simultaneously pivots a further pinion gear out of engagement with one of the frictional members to interrupt the slow speed drive force.

BRIEF DESCRIPTION OF THE DRAWINGS

The present invention will hereinafter be described with reference to the accompanying drawings in which.

DETAILED DESCRIPTON OF THE INVENTION

Figure 1:
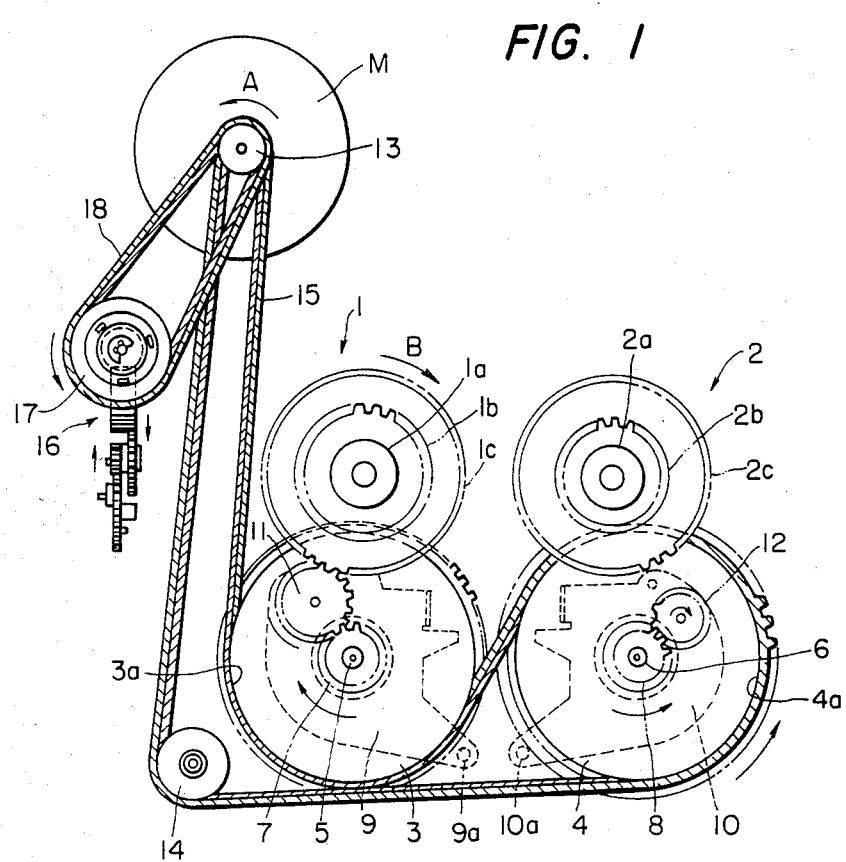
FIG. 1 is a plan view showing a manner for driving the reel assemblies for tape decks according to the present inventon.

FIG. 1 shows reel assemblies 1 and 2 for a tape deck and one example of a drive mechanism for driving the reel assemblies. More specifically, the reel assemblies 1 and 2 include respective central reel shafts 1a and 2a which are separated from each by a predetermined distance and which are rotatably provided on a chassis (not shown) of the tape deck. The reel shafts 1a and 2a extend in the vertical direction toward the underside of the drawing sheet and may engage with a pair of tape reels at their other extremities. Also, the reel assemblies 1 and 2 are each provided with respective rotational torque transmission gears 1b and 1c, and 2b and 2c. In the vicinity of the reel assemblies 1 and 2 are provided a pair of fly-wheels 3 and 4 which are rotatably mounted on the chassis. In the middle portions of the fly-wheels 3 and 4 are formed capstan shafts 5 and 6 which are integral with the fly-wheels 3 and 4 and coaxial therewith, respectively. The fly-wheels 3 and 4 are each provided with capstan gears 7 and 8 which are also integral and coaxial with the capstan shafts 5 and 6. In addition, as shown by dotted lines in FIG. 1, idler plates 9 and 10 are mounted for rotation relative to the fly-wheels 5 and 6, and are coaxial therewith. Idler gears 11 and 12 are rotatably provided on the idler plates 9 and 10 so that when an idler plate 9 or 10 is rotated in the clockwise or counterclockwise direction in the figure, the corresponding capstan gear 7 or 8 is selectively engaged with the rotational transmission gear 1c or 2c through the idler gear 11 or 12. Thus, a rotational torquuue from the fly-wheel 3 or 4 is transmitted to the reel assembly 1 or 2. Incidentally, the idler plates 9 and 10 are alternately driven by a well known rotational direction change-over mechanism (not shown) through pins 9a and 10a which are formed at end portions of the idler plates 9 and 10. Although the idler plates 9 and 10 are shown by the dotted lines for clarity of the figure, they are actually positioned so that the idler gears 11 and 12 are sandwiched between the idler plates 9 and 10 and the fly-wheels 3 and 4, respectively.

Each fly-wheel 3, 4 has formed on its outer circumferential surface a pulley 3a, 4a and a belt 15 is laid around a pulley 13 of a motor M and the pulleys 3a and 4a via an idler pulley 14 so that by rotation of the motor M the fly-wheels 3 and 4 are rotated in directions opposite to each other.

Between the pulley 13 of the motor M and a pulley 17 of a gear unit 16 is laid another belt 18. Since such a gear unit is very well known, the detailed construction and function of the gear unit 16 will not be described herein, although the gear unit 16 is important in view of the fact that the gear unit 16 serves to drive a head plate and other well known components.

Now, let us assume that the idler plate 9 is driven clockwise so that the idler gear 11 is engaged with the capstan gear 7 and the reel gear 1c. If the rotational pulley 13 of the motor M is driven in the direction A in FIG. 1, the reel assembly 1 is rotated in the direction B, also shown in FIG. 1. Conversely, if the idler plate 10 is driven counterclockwise, the reel assembly 2 is rotated counterclockwise, as a result of which the tape is fed in the opposite direction.

Figure 2:
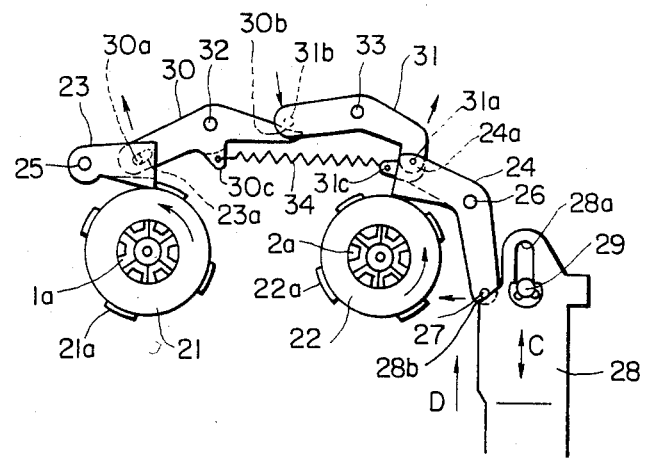
FIG. 2 is a plan view showing the reel reverse rotation preventing mechanism according to the present invention.

As shown in FIG. 2, ratchet wheels 21 and 22 each have, for example, four claws 21a and 22a and are each formed integrally and coaxially with respective reel shafts 1a and 2a. Claw or ratchet members 23 and 24 are rotatable about respective pivot pins 25 and 26 are fixed to the chassis (not shown). Thus, ratchet mechanisms are formed by the ratchet members 23 and 24 and the ratchet wheels 21 and 22. One end portion of each claw or ratchet member is substantially rectangular in shape, and the member 24 is provided with an extending portion on the opposite side from the portion engaging with the ratchet wheel 22. A pin 27 is implanted in the extending end portion. A release member 28 is formed integrally with the head plate (not shown) and is so constructed that the release member 28 may be movable or reciprocable in the direction C in association with the forward or rearward movement of the head plate with its oblong slot 28a being engaged with a guide pin 29 in a sliding manner. A cam 28b is formed on the periphery of the release member 28, and the cam 28b engages with the above described pin 27 of the ratchet member 24 while the pin 27 serves as a cam follower.

On the other hand, between the claw members 23 and 24 are formed a pair of swingable rods 30 and 31 which are pivotally mounted on respective pivot pins 32 and 33 fixed to the chassis. The swingable rod 30 has a pin 30a at one end which engages with a blind hole 23a formed in the claw member 23, whereas the swingable rod 31 has a pin 31a at one end which engages with a blind hole 24a formed in the claw member 24. The swingable rod 31 has at the other end a pin 31b through which the swingable rod 31 is abuttingly engaged with the swingable rod 30. More specifically, as shown in FIG. 2, when the claw member 24 is in contact with circumferential parts other than the claws 22a of the claw wheel 22, the pin 31b is slightly separated from the other end 30b of the swingable rod 30, and when the claw member 24 is brought into contact with the claws 22a of the claw wheel 22, the pin 31b is just in contact with the other end of the swingable rod 30. A spring 34 is provided between a stop hole 30c of the swingable rod 30 and a stop hole 31c of the swingable rod 31 so that the claw members 23 and 24 are both urged or biased toward their respective ratchet wheels 21 and 22.

With the reel reverse rotation preventing mechanism including the above described ratchet mechanism, if no force is applied to the swingable rod 24, the ratchet wheel 21 coupled to the reel assembly may only be rotated in the clockwise direction and the ratchet wheel 22 may only be rotated in the counterclockwise direction. If the release member 28 moves upwardly in conjunction with movement of the head plate (not shown), the member 24 will be pivoted clockwise to disengage from the ratchet wheel 22, simultaneously rotating the levers 31 and 30 counterclockwise and clockwise, respectively, to disengage the ratchet member 23 from the wheel 21. This will permit the wheels to rotate freely in either direction.

Figure 3:
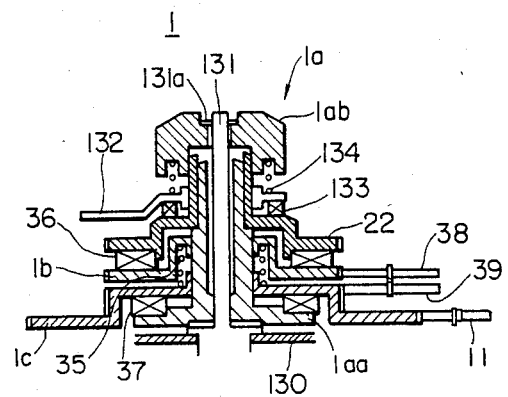
FIG. 3 is a cross sectional view showing the reel assembly according to the present invention.

FIG. 3 is a cross sectional view showing the reel assembly 1. The constructon of the reel assembly 2 is same as that of the reel assembly 1. As is apparent from FIG. 3, reel shaft unit 1a is rotatable around a stationary shaft 131 implanted in the chassis 130. Also, the ratchet wheel 21 is fixed to an intermediate portion of the reel shaft unit 1a and acts as a flanged portion confronting with a flanged portion 1aa through friction members to be described. The reel shaft unit 1a includes at its top portion a cap 1ab which is secured by a stopping means 131a. Between the ratchet wheel 21 and the cap 1ab is provided an arm 132 which forms a further part of the reel rotation preventing mechanism (not shown) which is well known and which is loosely engaged with the reel shaft unit 1a. Between the arm 132 and the ratchet wheel 21 is provided an annular frictional member 133 which is made of felt or the like. Between the arm 132 and the cap 1ab is provided a coil spring 134 which is adapted to press the arm 132 through the frictional member 133 onto a side surface of the ratchet wheel 21 so as to apply a predetermined frictional torque to the arm 132. Between the flanged portion 1aa and the ratchet wheel 21 is provided a gearing arrangement which is composed of rotational torque transmission gears 1b and 1c which are rotatable with respect to the reel shaft unit 1a and are coaxial with respect to the reel shaft unit. The rotational torque transmission gear 1c has a large diameter toothed portion to be engaged with the idler gear 11 at its outer periphery and a small diameter toothed portion which has a diameter equal to that of the rotational torque transmission gear 1b. Between the rotational torque transmission gear 1b and the rotational torque transmission gear 1c is interposed a coiled spring 35 which acts as a member serving to press the rotational torque transmission gears 1b and 1c against the side surfaces of the ratchet wheel 22 and the flanged portion 1aa through annular frictional members 36 and 37 which are made of felt or the like.

Pinion gears 39 and 38 engage with the small diameter toothed portion of the rotational torque transmission gear 1c and the gear 1b, respectively. Preferably, the pinion gears 38 and 39 are coaxially coupled to each other and are rotatable with respect to each other within a predetermined angular range. Thus, during high speed tape travelling, for example in fast forward or rewind when either the pinion gear 38 or 39 is driven to transmit a rotational torque to the two members, the pinion gears 39 and 38 are simultaneously engaged with the small diameter toothed portion of the gear 1c and the gear 1b.

Figure 4:
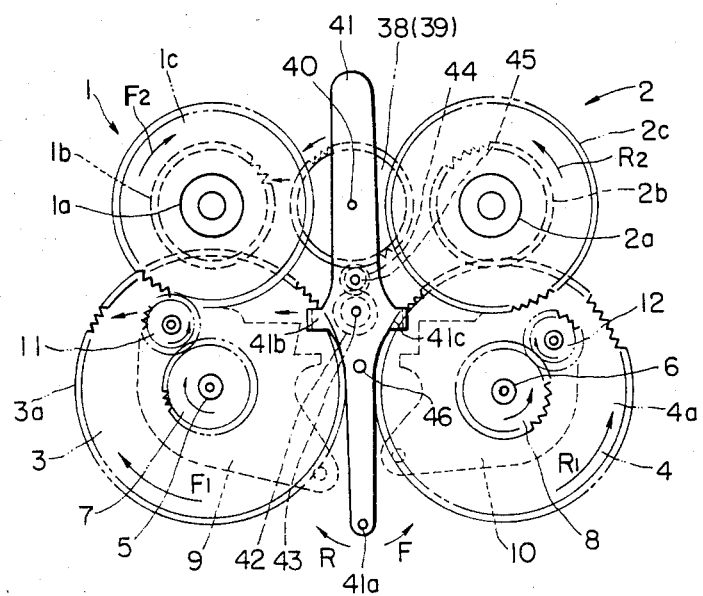
FIG. 4 is a plan view showing the reel drive mechanism according to the present invention.

Referring now to FIG. 4, a mechanism for undertaking the engagement and disengagement of the pinion gears 39 and 38 with respect to the gears 1c and 1b will be explained.

As shown in FIG. 4, the pinion gears 38 and 39 are rotatably mounted on a high speed rotation switching member 41 through a common pin 40. On the high speed rotation switching member 41 are rotatably mounted a pinion gear 42 via a pin 43 and an idler gear 44 via a pin 45. The idler gear 44 is engaged with the pinion gear 42 and either one of pinion gear 38 or 39. The high speed rotation switching member 41 is rotatably mounted on a pin 46 implanted in the chassis (not shown). The high speed rotation switching member 41 is to be rotated in the clockwise direction or in the counterclockwise direction by a high speed rotation switching device (not shown) via a pin 41a implanted in an end portion of the switching member 41. For example, in the fast forward mode, the switching member 41 is rotated in the direction F, while in the rewind mode it is rotated in the direction R as shown.

When the high speed rotation switching member 41 is rotated in the direction indicated by the arrow F, the pinion gear 42 is engaged with the gear 3a which is integral with the fly-wheel 3 and the pinion gears 39 and 38 are engaged with the gear 1b and the small diameter portion of the gear 1c. Simultaneously therewith, a projection 41b of the high speed rotation switching member 41 abuts a part of the idler plate 9 to thereby urge the idler plate 9 to rotate in the counterclockwise direction and release the engagement of the pinion gear 11 from the large diameter toothed portion of the gear 1c. Therefore, since at this time the fly-wheel is rotated in the direction indicated by the arrow $F_1$, the reel assembly 1 is rotated at a high speed via gears 42, 45 and 38, 39 in the direction indicated by the arrow $F_2$.

As is apparent from the foregoing description, in the tape reel drive mechanism according to the present invention, at least two rotational torque transmission gears which are engaged frictionally with the reel shaft are provided in the reel assembly. In the high speed tape travelling modes such as fast forward and rewind, the rotational torque is applied to the two rotation torque transmission gears whereas in the low speed tape travelling mode such as the play mode, the rotational torque is applied to only one of the torque transmission gears, whereby a suitable selection of the torque transmission coefficient may readily be achieved.

Further, in the high speed tape travelling mode, since the pinion gears which are substantially integrally coaxially formed with each other and engaged with the rotational torque transmission gears are provided but are rotatable relative to each other within a predetermined angular range, the engagement between the pinion gears and the rotational torque transmission gears may be smoothly and easily achieved.

Also, according to the present invention, in order to achieve the frictional engagement between the above described two rotational torque transmission gears and the reel shaft, a pair of flanged portions are adapted to clamp the rotational torque transmission gears, between which gears a single spring is interposed, to thereby urge the transmission gears to move separately from each other, i.e., the gears are urged against the flanged portions. At the same time, frictional members are provided between the gears and the flanged portions. Thus, with the single spring, the height of the reel assembly as a whole may be reduced. Also, since one of the flanged portions acts as a ratchet wheel for the reel reverse rotation preventing mechanism, the number of necessary mechanical parts may be advantageously dscreased.

What is claimed is:

1. In a tape machine including at least one reel shaft unit having an upper portion for engaging a cassette reel and drive means for providing a rotational force to said shaft unit, the improvement characterized in that said shaft unit comprises:
    a first pinion gear connected to said driving means;
    a second pinion gear connected to said driving means;
    a first flange member;
    a second flange member coaxial with said first flange member;
    a first rotational torque transmission gear for receiving said rotational force from said first or said second pinion gear and coaxial with respect to said flange units and disposed therebetween;
    a second rotational torque transmission gear, for receiving said rotational force from said first pinion gear, coaxial with said flange units and disposed between said first gear and said second flange unit, said second gear being rotatable relative to said first gear;
    spring means between said first and second gears for urging said first and second gears into frictional engagement with said first and second flange members, respectively; and
    means for selecting whether said first or said second pinion gear is connected to said first and second transmission gears.

2. The tape machine of claim 1, further comprising means for preventing reverse rotation of the reel, wherein said means for preventing includes either one of said flange members.

3. The tape machine of claim 2, wherein said either one of said flange members includes at its circumference a plurality of ratchet teeth and further comprising a movable claw which in a stopping position permits movement of said teeth only in one direction and means for moving said claw into said stopping position.

4. The tape machine of claim 1, wherein said spring means consists of only a single coil spring.

5. The tape machine of claim 1, further comprising frictional means disposed between said first transmission gear and first flange and between said second transmission gear and said second flange.

6. The tape machine of claim 5, wherein said frictional means includes two frictional members made of felt.

7. The tape machine of claim 1, wherein said first transmission gear includes a first set of gear teeth of one radius for receiving said rotational force during a first mode of operation and a second set of gear teeth for receiving said rotational force simultaneously with the second transmission gear during a second mode of operation.

8. In a tape machine of the type including a rotatable reel shaft unit for engaging and rotating a cassette reel, a tape travel mode controlling and driving mechanism comprising:
    a pair of rotational torque transmission coaxially rotatable with respect to said shaft unit and in frictional engagement therewith; and
    drive means for imparting a rotational torque to one of said rotational torque transmission gears to rotate said shaft unit at a low speed and for imparting a rotational torque simultaneously to both of said rotational torque transmission gears to rotate said reel shaft at a higher speed.

9. The tape travel mode controlling and driving mechanism of claim 8, wherein said drive means includes a first pinion gear engageable with said one of said rotational torque transmission gears and second and third pinion gears simultaneously engageable with respective ones of said rotational torque transmission gears, said second and third pinion gears being provided coaxially with each other.

10. The mechanism of claim 9, wherein said second and third pinion gears are independently rotatable within a predetermined angular range.

11. The tape travel mode controlling and driving mechanism of claim 9, wherein said drive means include a first pivoting member on which said first pinion gear is rotatably mounted and a second pivoting member on which said second and third pinion gears are mounted, said second pivoting member pivoting said second and third pinion gears into engagement with said torque transmission gears and simultaneously abutting said first pivoting member to pivot said first pinion gear out of engagement with said first rotational torque transmission gear.

12. The tape travel mode controlling and driving mechanism of claim 9, wherein said one of said rotational torque transmission gears includes a first set of gear teeth of one radius engageable by said first pinion gear and a second set of gear teeth of a different radius and engageable with one of said second and third pinion gears.

13. The tape machine of claim 1, wherein said first pinion gear comprises two coaxial pinion gears, rotatably coupled within a predetermined angular range, each of said coaxial pinion gears connected separately to said first or second transmission gear.

* * * * *